CATHODE FOLLOWER TYPE MODULATOR CIRCUIT

Filed Feb. 17, 1967

INVENTORS
JULIAN S. BETTS
RALPH A. ARMSTRONG

BY Hopgood & Calimafde
ATTORNEYS

3,501,715
CATHODE FOLLOWER TYPE MODULATOR CIRCUIT

Julian S. Betts, Box 337, Rte. 1, College Park, Ga. 30337, and Ralph A. Armstrong, 2835 Connally Drive SW., Atlanta, Ga. 30311

Filed Feb. 17, 1967, Ser. No. 616,886
Int. Cl. H03c 1/02
U.S. Cl. 332—64 3 Claims

ABSTRACT OF THE DISCLOSURE

The improvement in a modulation system of the type applying signals through a cathode-follower to the screen gride electrode of an RF amplifier for avoiding screen grid voltage variations. A series circuit including a reactance and an auxiliary vacuum tube for connection between the cathode-follower and ground is supplemented by a second circuit coupled to the first vacuum tube's grid and responsive to variations in the screen voltage to vary the grid bias and hence the plate resistance of the vacuum tube.

Figures 1, 2:
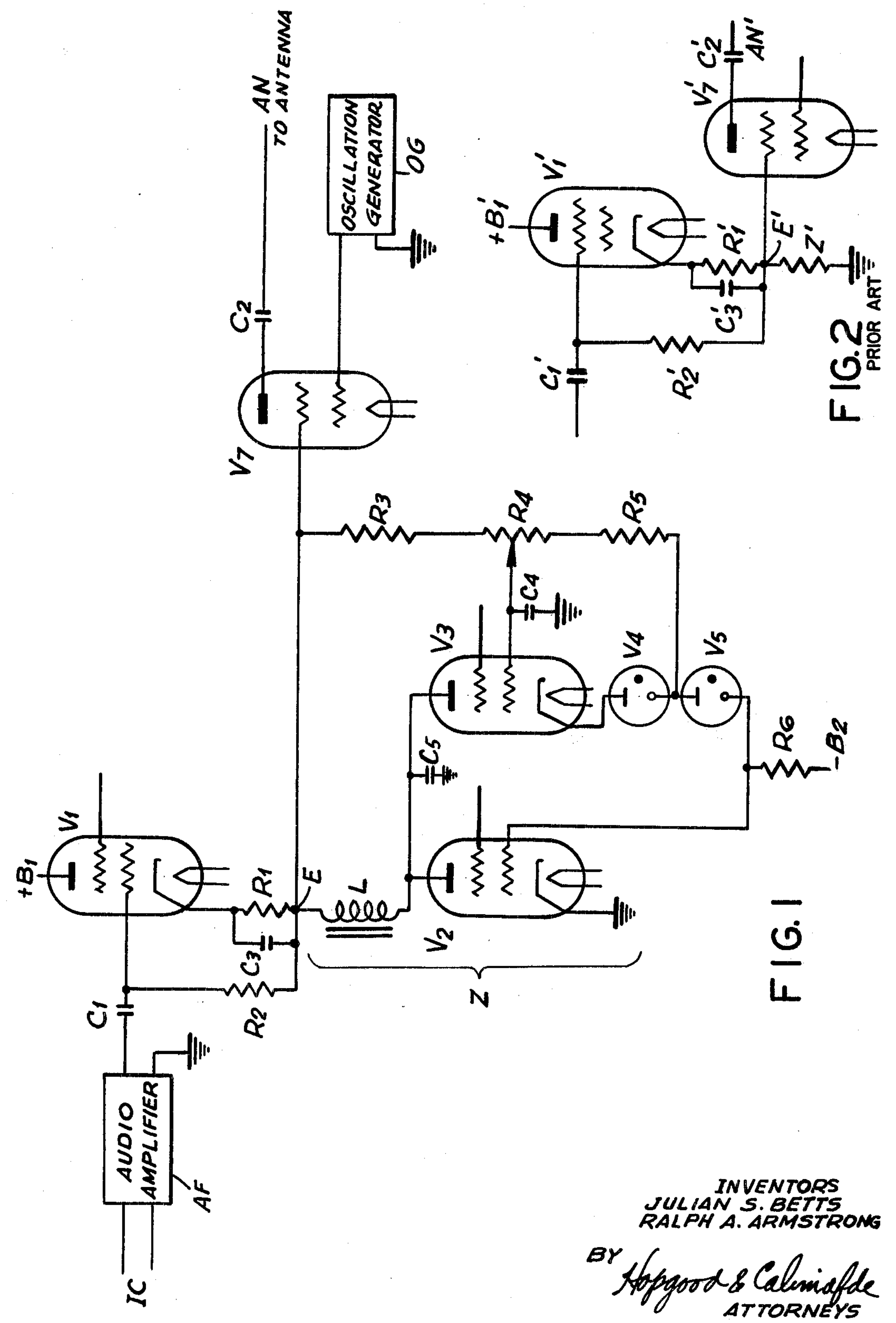
FIG. 1, FIG. 2 PRIOR ART

This invention relates to modulation apparatus for radio frequency transmitters, and more specifically to a cathode-follower used to modulate the screen grid of a radio frequency power amplifier.

In conventional radio transmitters employing screen grid modulation, a fixed D.C. voltage is applied to the screen grid electrode of a radio frequency amplifier tube. To modulate the radio frequency amplifier, an audio frequency signal voltage is superimposed on the D.C. voltage already applied to the screen grid. As the screen grid voltage varies according to the audio frequency signal, the output power of the stage varies correspondingly, producing the desired modulation. It is well known, however, that modulation accomplished in this manner is accompanied by several undesired effects, the most apparent of which are non-linearity of modulation and carrier-shift. These effects are caused by the non-linearity of the screen grid resistance. This characteristic of the screen grid electrode causes it to represent a lower resistance when a high voltage is applied than when a low voltage is applied. When an alternating voltage is applied the screen grid resistance is lower on the positive half-cycles and higher on the negative half-cycles. The load impedance presented to the modulator stage is therefore not constant during the entire cycle and the audio frequency signal bcomes distorted. In addition, since the load presented to the D.C. screen voltage source varies with modulation, the average D.C. screen voltage will change as modulation is applied. Due to the fact that the carrier level is affected by screen voltage, any change in average D.C. screen voltage will produce carrier-shift and result in further distortion of the radiated signal.

It is therefore one of the objects of this invention to substantially supress or eliminate the undesired D.C. variations introduced by the screen electrode in the modulating stage or stages of a radio transmitter.

In accordance with this invention, the resistance variation that is introduced at the screen grid of a modulated tube will be counteracted by an equal and opposite variation in the load circuit of the cathode-follower modulator stage. The result accomplished is that the load impedance presented to the modulator stage and also to the D.C. screen voltage source is constant. The screen grid of the modulated tube is therefore affected only by the audio signal, without any adverse effect due to possible D.C. variations. Substantially "pure" modulation is therefore accomplished by the modulating system.

This invention will be better understood from the more detailed description hereinafter following when read in connection with the accompanying drawing in which:

FIG. 1 schematically illustrates a form of the invention shown applied specifically to a portion of a radio broadcast transmitter; and FIG. 2 shows part of a conventional cathode-follower used as the screen grid modulator of a radio transmitter which is shown here merely to point out earlier practices and therefore clarify the subject matter of the invention disclosed in FIG. 1.

Rerferring to FIG. 1 of the drawing, there is shown a schematic of a part of an AM radio broadcast transmitter to which the invention has been applied. Specific details which would be apparent to those skilled in the art have been omitted in the interest of clarity and in the desire to confine the disclosure to the present invention.

The input circuit IC receives audio-frequency signals, such as speech, which are to be amplified and used to modulate a carrier of a predetermined frequency. The input circuit IC is connected via a capacitor $C_1$ and audio frequency of AF to the control grid of a screen grid cathode-follower modulator tube $V_1$. The box OG generally represents an oscillation generator which is preferably controlled by a piezoelectric crystal (not shown), the oscillation generator producing the predetermined carrier or radio frequency wave upon which the audio-frequency signals are to be superimposed or modulated. The oscillation generator OG is in turn connected to the control grid of a vacuum tube power amplifier $V_7$ (or to two or more such amplifiers in parallel). The anode of the vacuum tube $V_7$ is in turn connected through a capacitor $C_2$ to an antenna circuit AN for propagating the modulated signals into space.

The vacuum tube $V_1$ is a screen grid cathode-follower. The cathode of the tube $V_1$ is connected to a resistor $R_1$ which is shunted by a capicitor $C_3$. The parallel resistor $R_1$ and capacitor $C_3$ serve as a source of D.C. grid bias voltage for the control grid of tube $V_1$. The bias voltage is supplied to the control grid through a resistor $R_2$.

The reference character Z designates the cathode-follower load impedance consisting of inductor L and the plate resistance of regulator tube $V_2$ in series to ground. The control grid of this tube $V_2$ receives its bias voltage from a negative source of voltage $B_2$ through resistor $R_6$. Vacuum tube $V_3$ which is of the screen grid type and two voltage regulator tubes $V_4$ and $V_5$ are connected in series from the plate of $V_2$ to the junction of resistor $R_6$ and the control grid of $V_2$. Resistors $R_3$, $R_4$ and $R_5$ are connected in series between point E and the junction of regulator tubes $V_4$ and $V_5$. Resistor $R_4$ is adjustable so that the control grid of $V_3$ may be moved in either direction along the resistor. Capacitor $C_4$ is connected from the control grid of tube $V_3$ to ground. Capacitor $C_5$ is connected from the junction of the plates of tubes $V_2$ and $V_3$ to ground.

In order to explain the operation of conventional circuits of prior systems, reference may now be made to FIG. 2 which schematically illustrates a conventional cathode-follower circuit used as a screen grid modulator in a radio transmitter. The vacuum tube $V_1'$, which may be identical to tube $V_1$, employs a similar cathode bias resistor $R_1'$ and capacitor $C_3'$ which together produce a D.C. voltage for application to the control grid of the vacuum tube $V_1'$ through resistor $R_2'$. The lower terminal of resistor $R_1'$ is connected to ground through a fixed load resistor or impedance Z' and this same terminal (E') is connected to the screen grid of the power amplifier vacuum tube $V_7'$. As will now be explained, this screen grid, because of its nonlinearity in response to applied audio signals, introduces a varying D.C. voltage which distorts the effect intended to be produced at this screen electrode.

In the conventional arrangement of FIG. 2, the screen grid of tube $V_7'$ and the load resistor or impedance Z' are connected effectively in parallel with each other with respect to ground as shown here. Since the screen current in tube $V_7'$, and therefore the screen resistance of this tube, varies with the A.C. modulation applied by the action of the cathode-follower $V_1'$, the average D.C. voltage at point E' and on the screen grid of tube $V_7'$ will also vary in accordance with the modulation signals. This conjoint action of the A.C. and D.C. voltages produces an undesirable effect into the signals to be radiated and the radiated signals, so distorted, naturally degrade the quality of signals reproduced by receivers tuned to the station.

The distortion arises because of the non-linearity of the screen grid resistance of tube $V_7'$ as it responds to the applied A.C. voltage. The D.C. voltage drop across Z' is utilized as the screen grid voltage of tube $V_7'$. This D.C. voltage should remain constant under all operating conditions. However, since the voltage appearing at point E' is the product of the plate current of $V_1'$ times the resistance between point E' and ground, any variation in resistance of the screen grid circuit of tube $V_7'$ will cause a change in the D.C. voltage at point E'. This invention is based essentially on the removal or nullification of this D.C. voltage change at point E'.

This undesired effect of conventional cathode-followers can be overcome, in accordance with this invention, by having the cathode-follower load resistance Z' in effect made variable in inverse proportion to the screen grid resistance variations. By introducing such an inversely varying resistance the total cathode-follower load resistance may be kept constant and the D.C. screen voltage will remain constant and independent of A.C. modulation.

Thus, the undesired effect produced by conventional cathode-followers in typical transmitters or other equipments may be overcome by the regulator arrangement of FIG. 1. In FIG. 1, for example, a relatively high positive D.C. voltage $B_1$ applied to the anode of tube $V_1$ will divide along the path to ground in such a way that a desired screen voltage will appear at point E of FIG. 1. The voltage of source $B_1$ may be traced over a series path which includes the anode and cathode of tube $V_1$, resistor $R_1$, inductance L and the anode and cathode of tube $V_2$. In a typical circuit in which a voltage of, for example, 1700 volts (D.C.) was employed at source $B_1$, and negative 120 volts (D.C.) was employed at source $B_2$, the voltage at point E was approximately 440 volts (D.C.). The voltage at E was also applied to a series circuit of resistors $R_3$, $R_4$ and $R_5$ with the opposite end of the series connected to the junction of a regulator tubes $V_4$ and $V_5$. Regulator tube $V_4$ maintains a fixed potential difference across its terminals so that the grid voltage of tube $V_3$ was normally approximately 15 volts negative. The plate current of tube $V_3$ produces a voltage drop across resistor $R_6$ which sets the grid voltage of tube $V_2$ and therefore its internal resistance. The voltage reaching the grid of tube $V_3$ was controlled by the position of the tap on resistor $R_4$.

By proper adjustment of the tap on resistor $R_4$, a selected voltage will be applied to the control grid of tube $V_3$ which in turn will set its plate current and hence the control grid voltage of tube $V_2$. Since the plate resistance of tube $V_2$ is controlled by its grid voltage, the voltage at point E will be determined by the voltage at the tap on resistor $R_4$.

If the D.C. voltage at point E changes due to the varying resistance of the screen of tube $V_7$, the grid voltage of tube $V_3$ will change. The resulting plate current change of tube $V_3$ and corresponding change in voltage drop across resistor $R_6$ will cause the grid voltage of tube $V_2$ to assume a new value. This new value of grid voltage will alter the plate resistance of tube $V_2$ in such a manner that the change in screen resistance of tube $V_7$ is nullified. That is, if the screen resistance of tube $V_7$ decreases, the plate resistance of tube $V_2$ will increase, and vice versa. Hence, the average D.C. voltage applied to the screen grid of tube $V_7$ will be made substantially constant and practically unaffected by the A.C. modulation.

The audio frequency variations reaching the grid of tube $V_3$ are suppressed by the low impedance path to ground provided by capacitor $C_4$. Audio frequency variations appearing at the plate of tube $V_3$ are suppressed by capacitor $C_5$. Inductance L provides a high impedance load for the A.C. modulation voltage at point E.

What is claimed is:

1. In a modulation system of the type applying A.C. modulation signals through a cathode-follower to the screen grid electrode of a radio frequency amplifier tube, the improvement for avoiding the introduction of variations in the D.C. screen voltage caused by the A.C. modulation signals, which comprises; a series circuit including a reactance and a vacuum tube having a grid electrode connected between the cathode-follower and ground; and means coupled to the grid of said vacuum tube and the screen of said amplifier tube, and responsive to changes in the D.C. screen voltage for varying the grid voltage of said vacuum tube in a predetermined direction to vary the plate resistance thereof, thereby stabilizing the D.C. screen voltage.

2. The improvement claimed in claim 1, wherein said means coupled to the grid of said vacuum tube comprises a second series circuit including resistive means and a voltage regulator coupled between the cathode-follower and a source of negative voltage; a second vacuum tube, having a grid electrode, said grid being connected to a select point in said second series circuit, the plate of which is coupled in common with said first vacuum tube plate and the cathode of which is coupled to the grid of said first vacuum tube.

3. The improvement claimed in claim 2 in which said resistive means comprises a tapped resistor with the tap thereof being connected to the grid of said second vacuum tube.

References Cited

UNITED STATES PATENTS

| | | | |
|---|---|---|---|
| 2,450,445 | 10/1948 | Rosencrams | 332—37 |
| 2,572,832 | 10/1951 | Bernard | 328—10 |
| 2,755,377 | 7/1956 | Tissot | 328—10 |
| 2,678,391 | 5/1954 | Lappin | 328—10 |
| 2,896,073 | 7/1959 | Westphal | 325—186 X |

ALFRED L. BRODY, Primary Examiner

U.S. Cl. X.R.

325—186; 328—10; 332—37